United States Patent [19]

Corbett et al.

[11] 4,261,594
[45] Apr. 14, 1981

[54] TRAILER WITH CONVERTIBLE HITCH

[75] Inventors: Wendell E. Corbett, P.O. Box 711, Watertown, S. Dak. 57201; Laverne C. Lebert, Henry, S. Dak.

[73] Assignee: Wendell E. Corbett, Watertown, S. Dak.

[21] Appl. No.: 22,704

[22] Filed: Mar. 22, 1979

[51] Int. Cl.³ .............................................. B60D 1/14
[52] U.S. Cl. ................................. 280/495; 280/415 R; 280/423 B; 280/656
[58] Field of Search ............... 280/423 R, 423 B, 495, 280/415 R, 491 R, 491 E, 492, 493, 504, 415 A, 495, 656, 789; 296/181; 52/143

[56] References Cited

U.S. PATENT DOCUMENTS

| | | | |
|---|---|---|---|
| 3,664,686 | 5/1972 | Anderson | 280/490 R |
| 3,698,740 | 10/1972 | Chisholm | 280/491 |
| 3,759,547 | 9/1973 | Ankeny | 280/495 |
| 3,815,936 | 6/1974 | Oaks | 280/415 |
| 3,840,252 | 10/1974 | Jocoy | 280/415 A |
| 4,000,911 | 1/1977 | Weber | 280/468 |
| 4,067,158 | 1/1978 | Lawrence | 52/143 |

FOREIGN PATENT DOCUMENTS 1331965  9/1973  United Kingdom ..................... 280/495

Primary Examiner—John J. Love
Assistant Examiner—Randall A. Schrecengost
Attorney, Agent, or Firm—Wegner, Stellman, McCord, Wiles & Wood

[57] ABSTRACT

A trailer to be towed behind a vehicle has a convertible trailer hitch mounting on its front end in which a connecting portion of a trailer hitch is detachably secured so either a straight draw bar connected hitch or a gooseneck fifth wheel connected hitch may be used on the trailer. The hitch mounting has an upwardly open frame with forwardly converging thrust plates at its lateral extremities, while the trailer hitch connecting portion has a base plate that seats in the frame and integral forwardly converging side plates that abut the thrust plates of the hitch mounting frame.

20 Claims, 6 Drawing Figures

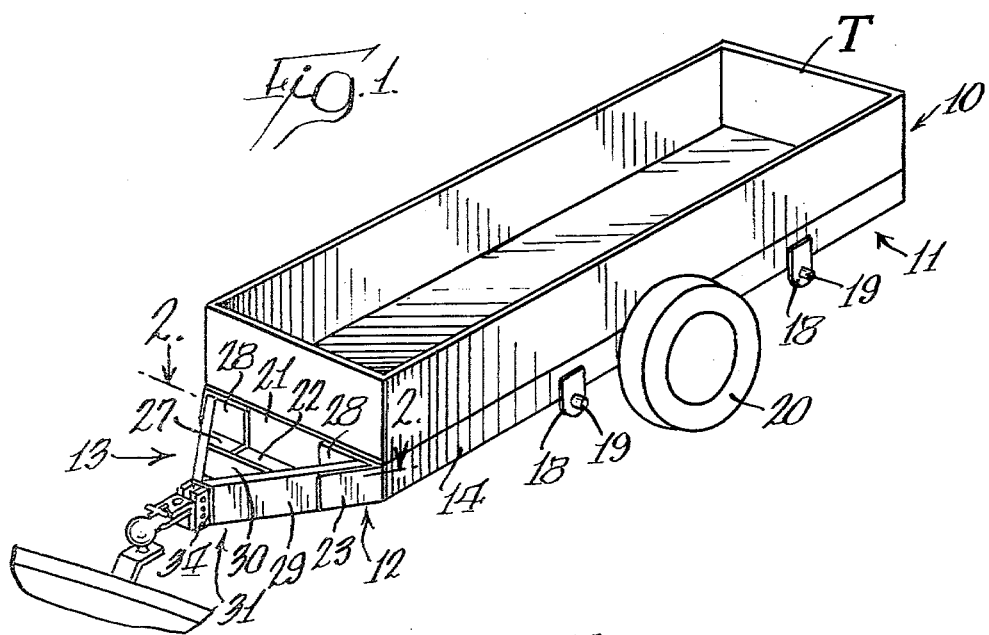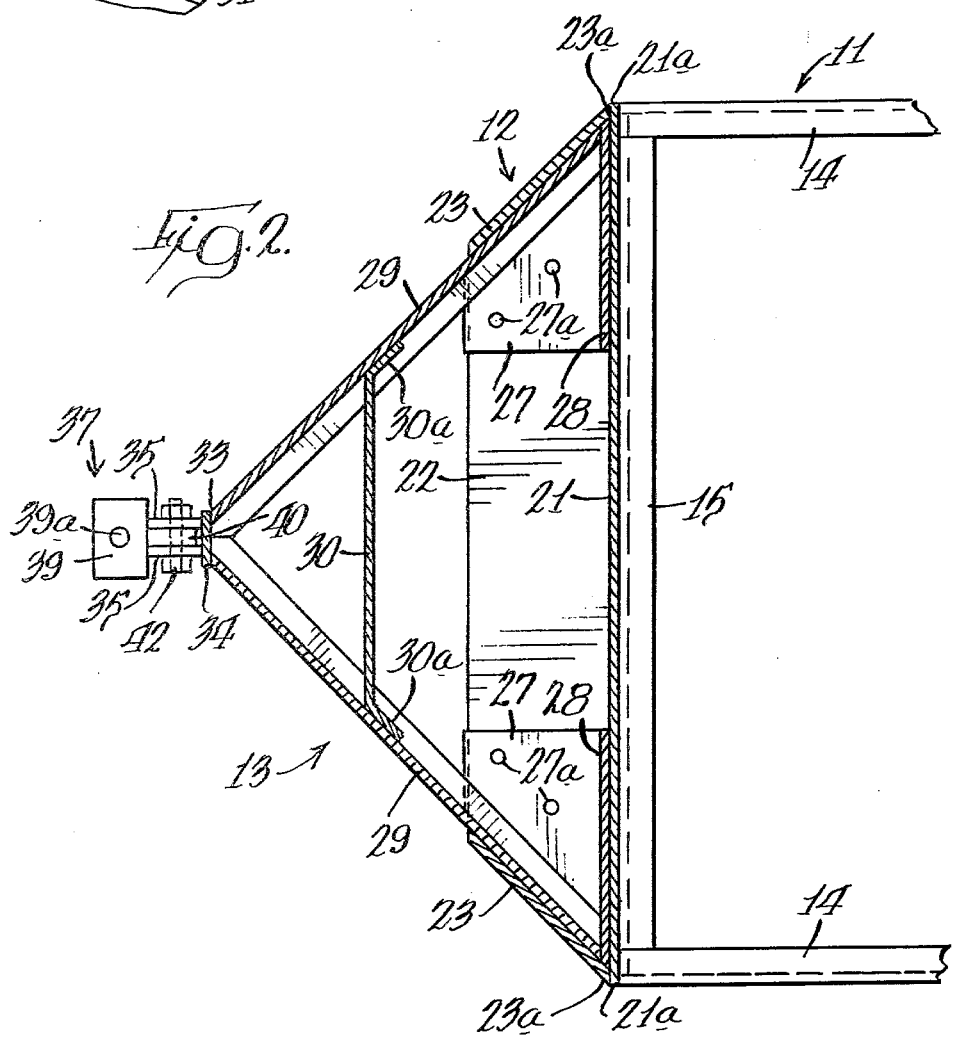

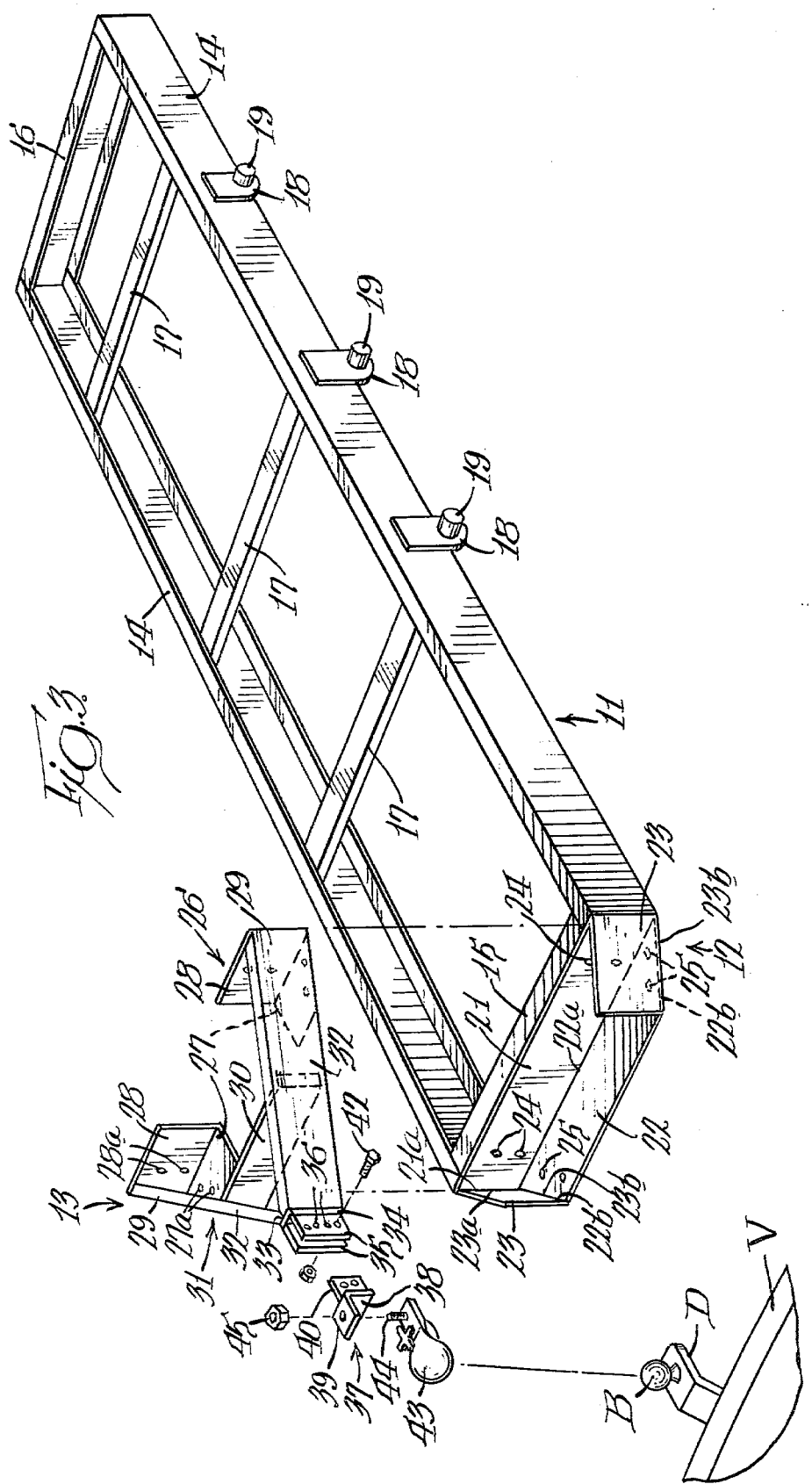

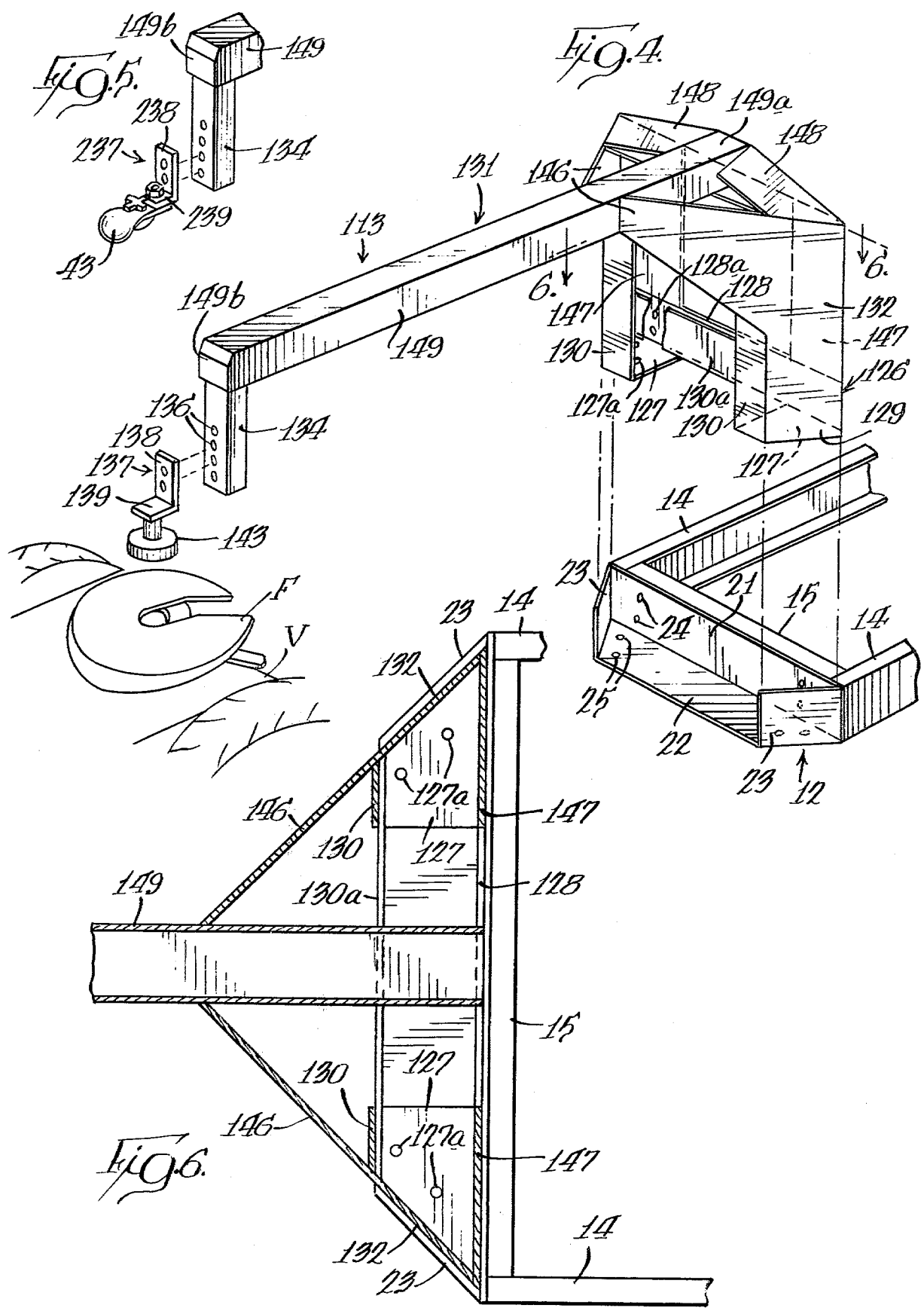

TRAILER WITH CONVERTIBLE HITCH

BACKGROUND OF THE INVENTION

There are a variety of circumstances in which it is desirable for a two-wheel trailer to be attachable either to a draw bar at the rear of a towing vehicle or to a fifth wheel or hitch ball which may be in the box of a pickup truck or upon a highway tractor. A draw bar may have a simple pintle connection, or may have a ball on it for a ball and socket connection. A draw bar may be on the rear of a strictly passenger vehicle, or upon the rear of a pickup truck, or upon a farm tractor.

Applicants are aware of only two U.S. patents which disclose a trailer which may be equipped alternately with a gooseneck or a draw bar hitch. Those are U.S. Pat. Nos. 3,698,740 and 3,815,936.

SUMMARY OF THE INVENTION

In accordance with the present invention, a unitary hitch frame is fixed to and extends forwardly from a transverse member at the front of the trailer so that a trailer hitch connecting portion may be seated in the unitary frame. The frame has horizontal floor plate means and a pair of upright thrust plates at the lateral extremities of the floor plate means, with the thrust plates converging toward the front. The connecting portion of a trailer hitch has a base plate that seats in the frame on the floor plate and has integral, forwardly converging side plates that abut the thrust plates of the hitch mounting frame. Forward of the trailer hitch connecting portion there is a hitch portion which is either straight for attachment to a draw bar, or goosenecked for attachment to a fifth wheel or ball in the bed of a pickup truck or on the rear of a highway tractor. The trailer hitch connecting portion bolts into the hitch mounting frame.

The apparatus provides a very strong, rugged and simple arrangement for converting a trailer so that it may be connected to either of the two basic types of towing vehicle connections.

THE DRAWINGS

FIG. 1 is a perspective view of a trailer provided with the hitch mounting frame of the present invention with a trailer hitch mounted in it that is adapted for connection to a towing vehicle draw bar;

FIG. 2 is a fragmentary sectional view on an enlarged scale taken substantially as indicated along the line 2—2 of FIG. 1;

FIG. 3 is a perspective view of the trailer chassis with the wheels removed, a draw bar-type hitch removed from the hitch mounting frame, a vertically adjustable hitch yoke disconnected from the forward extremity of the trailer hitch, a socket attachment disconnected from the hitch yoke, and a vehicle draw bar with a ball which fits the socket;

FIG. 4 is a fragmentary perspective view similar to FIG. 3, but illustrating a gooseneck trailer hitch disassembled from the hitch mounting frame, with a hitch yoke detached from the forward extremity of the gooseneck that has a fifth wheel-type connection on it, and with a schematic view of a fifth wheel on the rear of a highway tractor;

FIG. 5 is a fragmentary view of the forward extremity of the gooseneck hitch of FIG. 4 with a hitch yoke on it to which is connected a detachable socket like that illustrated in FIG. 3; and FIG. 6 is a fragmentary sectional view on an enlarged scale taken substantially as indicated along the line 6—6 of FIG. 4.

DETAILED DESCRIPTION OF THE INVENTION

Referring to the drawings in greater detail, and referring first to FIGS. 1 and 3, a trailer, indicated generally at 10, has a chassis, indicated generally at 11; and at the front of the chassis is a trailer hitch mounting frame, indicated generally at 12. The trailer hitch mounting frame 12 is adapted to selectively receive either a straight draw bar connected hitch, indicated generally at 13; or a gooseneck connected hitch, indicated generally at 113 (FIG. 4). The straight draw bar connected hitch 13 is adapted to be pivotally connected to a draw bar D on the rear of a vehicle V; and the gooseneck hitch 113 may alternatively be constructed for pivotal attachment to a fifth wheel F mounted in the rear of a vehicle V, or to a ball mounting in the rear of the vehicle such as the ball mounting B seen on the draw bar D in FIG. 3.

The trailer chassis 11 is best seen in FIGS. 2 and 3 to consist of longitudinal side channel members 14, a front transverse channel member 15 and a rear transverse channel member 16. Any desired number of intermediate cross braces 17 connect the longitudinal channels 14; and a plurality of pairs of wheel mounting brackets, such as the brackets 18 in FIGS. 1 and 3, are welded to the longitudinal side channels 14 and have integral wheel receiving spindles which are indicated diagrammatically in FIGS. 1 and 3 as cylindrical bosses. In practice, of course, the wheel mounting brackets 18 are furnished with whatever sort of mountings may be needed to rotatably receive wheels, such as the wheel 20 seen in FIG. 1. The plurality of wheel mounting brackets 18 permits the chassis to be assembled with a single pair of wheels 20 which may be mounted upon any one of the three sets of brackets 18, depending upon the way in which a trailer body T is balanced upon the chassis 11. In addition, if the trailer 10 is designed to carry heavy loads, it may be supplied with tandem wheels mounted upon any two pairs of the wheel brackets 18. It is obvious that any type of body may be mounted upon the chassis 11, rather than the simple box body shown in FIG. 1.

The trailer hitch mounting frame is best seen in FIGS. 2, 3 and 4 to consist of transverse attaching plate means 21 which, in the particular embodiment illustrated, constitutes a single plate which is welded to the front transverse member 15 and has lateral ends 21a which are widely spaced and preferably aligned with the side channel members 14. The hitch mounting frame 12 also has horizontal floor plate means 22 which, in the illustrated embodiment, consists of a single plate having a rear margin 22a welded along the lower edge of the attaching plate 21. The floor plate 22 has widely spaced lateral extremities 22b which converge toward the front; and perpendicular to the floor plate 22 are forwardly converging thrust plates 23 which have their rear margins 23a welded to the attaching plate 21 and which have lower margins 23b welded along the lateral extremities of the floor plate means 22. Bolt holes 24 are formed in the attaching plate means 21 and the front transverse member 15; and bolt holes 25 are formed in the floor plate means 22.

Referring now to FIG. 3, the straight trailer hitch 13 has a connecting portion, indicated generally at 26 which includes base plate means 27; back plate means 28; forwardly converging upright side plates 29, and a transverse front plate 30 having end portions 30a which are welded to the upright side plates 29.

The trailer hitch 13 also includes a hitch portion, indicated generally at 31, consisting of extensions 32 of the converging side plates 29 which meet at a forward extremity 33 on which there is an upright structural member 34 in the form of a channel with forwardly extending parallel webs 35 in which there are vertically spaced sets of aligned mounting holes such as the hole 36 seen in FIG. 3.

A hitch yoke, indicated generally at 37, consists of an angle member having an upright web 38 and a horizontal web 39 with a mounting flange 40 which has one or more securing holes 41 that register with a set of the mounting holes 36 so that a fastener such as a bolt 42 may extend through the aligned mounting holes 36 and the registering securing hole 41 and receive a nut by means of which the hitch yoke 37 is firmly secured to the upright structural channel 34 in any of several positions of vertical adjustment.

As illustrated in the drawings, the hitch yoke 37 receives a fitting 43 which has a threaded mounting stud 44 that extends through a mounting hole 39a in the horizontal flange 39 of the hitch yoke 37 and receives a fastening nut 45. The fitting 43 is of a well known type which has a recessed socket in its lower surface which receives the ball B to make a ball and socket connection between the trailer hitch 13 and the draw bar D.

As is well known in the art, the draw bar D may simply have a hole instead of the ball B, in which event the fitting 43 is omitted and a pintle extends through the hole 39a of the horizontal web 39 and through the hole in the draw bar D.

Referring now particularly to FIGS. 4 and 6, the gooseneck hitch 113 has a connecting portion, indicated generally at 126; and said connecting portion consists of base plate means 127, transverse back plate means 128, and forwardly converging upright side plates 129 which are secured to the base plate means 127 and to the back plate means 128. At the forward ends of the converging upright side plates 129 are aligned transverse flanges 130 to which a transverse front plate 130a is welded.

A gooseneck hitch portion, indicated generally at 131, is integral with and extends forwardly from the connecting portion 126. The hitch portion 131 consists of upward extensions 132 of the converging side plates 129, with forward extensions such as the extension 146 seen in FIG. 4 which are forwardly converging. There are also upward extensions 147 of the back plate means 128 which terminate at their upper ends in integral, forwardly extending bracing plates 148.

The hitch portion 131 also includes an elongated, hollow rectangular beam 149 which has a rearward portion 149a secured between the upward extensions 132 of the side plates, with welds connecting the sides of the beam 149 with the forward extensions 146 and with the forwardly turned structural bracing plates 148. At the front of 149b of the elongated beam 149 is a structural member in the form of a depending post 134 which is the structural equivalent of the channel member 34. A plurality of vertically spaced holes 136 are adapted to adjustably receive a hitch yoke, indicated generally at 137, which is secured to the post 134 by bolts which extend through holes in an upright web 138 of the hitch yoke 137. A horizontal web 139 of the hitch yoke has a fitting 143 which is of the type required to make a pivotal connection with the fifth wheel F illustrated in FIG. 4.

As seen in FIG. 5, a hitch yoke 237 may have an upright mounting web 238 and a horizontal web 239 which has a hole like the hole 39a in the web 39 to receive a threaded mounting post of a fitting 43 so that the gooseneck hitch may be connected, for example, to a ball mounted in the bed of a pickup truck.

As seen in FIGS. 3 and 4, the base plate means 27 and 127, and the back plate means 28 and 128 are provided with respective bolt holes 27a, 127a, 28a and 128a, which register with the bolt holes 24 and 25 in the trailer hitch mounting frame 13 to detachably secure either of the trailer hitches in the trailer hitch mounting frame.

From the foregoing detailed description it is apparent that the structure of the present invention provides a very simple and rugged means for converting a trailer from a straight draw bar connected hitch to a gooseneck hitch; and that in operation the trailer hitch connecting portion side plates are wedgingly confined between the converging thrust plates of the trailer hitch mounting frame. The trailer 10 may easily be changed from one type of hitch to the other merely by supporting its forward end upon the usual jackscrews, unbolting one hitch and bolting in the other one.

The foregoing detailed description has been given for clearness of understanding only and no unnecessary limitations should be understood therefrom as modifications will be obvious to those skilled in the art.

We claim:

1. In a chassis for a trailer which is adapted to be towed behind a vehicle, said chassis including a front transverse member and a pair of supporting wheels, a convertible trailer hitch mounting comprising, in combination:
    a unitary frame comprising horizontal floor plate means with widely spaced lateral ends, a pair of forwardly converging upright thrust plates integral with the lateral ends of the floor plate means, and attaching plate means integral with the rear of the floor plate means, said attaching plate means having an extended area in contact with and fixed to a surface of said front transverse member, said unitary frame providing an upwardly open structure in which a complementary connecting portion at the rear of a removable trailer hitch may be detachably seated.

2. The combination of claim 1 in which the attaching plate means is upright, transversely extending, has widely spaced outer ends, and is secured to the front surface of the front transverse member, and the upright thrust plates have rear margins fixed to said attaching plate means adjacent said outer ends.

3. The combination of claim 2 in which the thrust plates are perpendicular to the floor plate means.

4. The combination of claim 2 in which the attaching plate means and the floor plate means are both continuous.

5. The combination of claim 2 in which the convertible trailer hitch mounting is provided with bolt holes to receive hitch fastening bolts.

6. The combination of claim 5 in which there are bolt holes in the floor plate means.

7. The combination of claim 6 in which there are bolt holes in the attaching plate means.

8. The combination of claim 5 in which there are bolt holes in the attaching plate means.

9. The combination of claim 2 in which the floor plate means extends forwardly from the lower margin of the attaching plate means.

10. In a chassis for a trailer which is adapted to be towed behind a vehicle, said chassis including a front transverse member and a pair of supporting wheels, convertible trailer hitch means comprising, in combination:

a unitary trailer hitch mounting frame comprising horizontal floor plate means with widely spaced lateral ends, a pair of forwardly converging upright thrust plates integral with the lateral extremities of the floor plate means, and attaching plate means integral with the rear of the floor plate means, said attaching plate means having an extended area in contact with and fixed to a surface of said front transverse member;

and a trailer hitch detachably secured to said hitch mounting frame, said trailer hitch comprising, a connecting portion which is complementary to said mounting frame, said connecting portion having base plate means which seats upon the floor plate means of the frame, and forwardly converging upright side plates secured to the base plate means which lies between and abut the thrust plates of the frame, and a hitch portion integral with and extending forwardly from said connecting portion, said hitch portion having a forward extremity, and means on said forward extremity which is adapted to be pivotally connected to a towing vehicle.

11. The combination of claim 10 in which the trailer hitch connecting portion includes transverse back plate means at the rear of the unitary trailer hitch mounting frame and transverse front plate means fixedly secured to forward portions of the converging side plates behind said forward extremity.

12. The combination of claim 10 in which there is secured to the forward extremity of the hitch portion a channel with forwardly extending parallel webs provided with vertically spaced sets of aligned mounting holes, a hitch yoke attachable to a towing vehicle has a flange positioned between said webs and provided with a securing hole registering with one set of said mounting holes, and a fastener extends through said aligned mounting holes and said registering securing hole.

13. The combination of claim 12 in which there is secured to the forward extremity of the hitch portion a rectangular post provided with vertically spaced mounting holes, a hitch yoke attachable to a towing vehicle has a flange with a securing hole registering with one of said mounting holes, and a fastener extends through said mounting hole and said registering securing hole.

14. The combination of claim 10 in which the hitch portion of the trailer hitch comprises forward extensions of the converging upright side plates which are substantially the same height as the thrust plates, said forward extensions having front ends which are substantially in contact with one another at said forward extremity, and the means adapted to be pivotally connected to a towing vehicle comprises a hitch yoke secured to said forward extremity.

15. The combination of claim 10 in which the hitch portion of the trailer hitch comprises upward extensions of said side plates, an elongated beam which has its rearward portion secured between said upward extensions, and a depending post fixed to the front of said elongated beam and defining the forward extremity of said hitch portion, to provide a gooseneck hitch.

16. The combination of claim 15 which includes a plurality of structural bracing plates welded to the rearward portion of the elongated beam.

17. The combination of claim 10 in which the means on said forward extremity comprises a socket adapted to receive a hitch ball on a towing vehicle.

18. The combination of claim 15 in which the means on said forward extremity comprises an element of a fifth wheel apparatus.

19. The combination of claim 10 in which the trailer hitch mounting frame and the trailer hitch connecting portion have registering bolt holes to receive bolts for detachably securing the trailer hitch to the trailer hitch mounting.

20. In a chassis for a trailer which is adapted to be towed behind a vehicle, said chassis including a front transverse member and a pair of supporting wheels, a convertible trailer hitch mounting comprising, in combination:

a unitary frame fixed to and extending forwardly from said transverse member, said unitary frame comprising upright, transverse attaching plate means which is secured to the front surface of the front transverse member and has widely spaced outer ends, horizontal floor plate means which is fixed to and extends forwardly from said attaching plate means and has widely spaced lateral ends, and a pair of upright thrust plates which have rear margins fixed to said attaching plate means adjacent said outer ends and lower margins fixed to said floor plate means adjacent said lateral ends, said thrust plates converging toward the front.

* * * * *